United States Patent
Nehls et al.

(10) Patent No.: US 10,486,645 B2
(45) Date of Patent: Nov. 26, 2019

(54) LOCK FOR VEHICLE ACTIVE FRONT STEERING SYSTEM

(71) Applicant: Ford Global Technologies, LLC, Dearborn, MI (US)

(72) Inventors: Oliver Nehls, Düsseldorf/Nordrhein-Westfalen (DE); Joshua Guerra, Farmington Hills, MI (US); Jeremy Alan Rawlings, Canton, MI (US); Lodewijk Wijffels, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 599 days.

(21) Appl. No.: 14/947,527

(22) Filed: Nov. 20, 2015

(65) Prior Publication Data
US 2017/0144627 A1 May 25, 2017

(51) Int. Cl.
*B60R 25/02* (2013.01)
*B60R 25/0215* (2013.01)

(52) U.S. Cl.
CPC .............. *B60R 25/02153* (2013.01)

(58) Field of Classification Search
CPC . B60R 25/0215; B60R 25/02156; B62D 5/00; B62D 5/008
See application file for complete search history.

(56) References Cited

U.S. PATENT DOCUMENTS

| | | | | |
|---|---|---|---|---|
| 4,695,142 A * | 9/1987 | Holt | ...................... | G03B 15/003 347/226 |
| 4,876,649 A * | 10/1989 | Kawai | ...................... | B60R 25/00 701/49 |
| 5,031,715 A * | 7/1991 | Ogawa | ................. | B60K 31/047 123/198 DB |
| 5,211,080 A * | 5/1993 | Leising | ............... | F16H 61/0206 475/120 |
| 6,164,150 A * | 12/2000 | Shindo | ................... | B62D 5/008 180/404 |
| 6,718,242 B1 * | 4/2004 | Mori | ...................... | B62D 5/008 180/443 |
| 6,782,969 B2 * | 8/2004 | Kodama | ................ | B62D 5/008 180/421 |

(Continued)

FOREIGN PATENT DOCUMENTS

JP 4019315 12/2007
KR 20130013100 2/2013

*Primary Examiner* — Zakaria Elahmadi
(74) *Attorney, Agent, or Firm* — Raymond L. Coppiellie; Bejin Bieneman PLC

(57) ABSTRACT

A system for a vehicle includes a gear and a plate fixed to the gear. The gear is driving by a motor for providing relative rotation between a steering wheel and steering shaft of the vehicle in an adaptive front steering system. The system includes a solenoid including a coil and a pin moveable relative to the coil to engage the plate based on a signal. A sensor is configured to detect a change in current through the coil associated with initial movement of the pin relative to the coil. The system includes a controller programmed to change the duty cycle signal in response to the change in current to slow movement of the pin to reduce or eliminate a clicking noise associated with the pin seating in an extended position or retracted position.

16 Claims, 7 Drawing Sheets

(56) References Cited

U.S. PATENT DOCUMENTS

| | | | | |
|---|---|---|---|---|
| 6,840,347 B2* | 1/2005 | Nakatsu | | B62D 5/008 180/444 |
| 6,868,933 B2* | 3/2005 | Kameya | | B62D 5/0481 180/404 |
| 7,004,281 B2* | 2/2006 | Hidaka | | B62D 5/008 180/422 |
| 7,669,691 B2* | 3/2010 | Yamanaka | | B62D 5/008 180/404 |
| 7,681,688 B2* | 3/2010 | Nakatsu | | B62D 5/008 180/444 |
| 8,662,242 B2* | 3/2014 | Yamakawa | | B62D 5/008 180/443 |
| 9,567,002 B2 | 2/2017 | Rawlings | | B62D 6/001 |
| 2004/0021284 A1 | 2/2004 | Nakatsu | | B62D 5/008 280/93.513 |
| 2005/0178607 A1* | 8/2005 | Kodama | | B62D 1/166 180/422 |
| 2005/0229592 A1* | 10/2005 | Kobayashi | | B62D 5/008 60/387 |
| 2005/0279867 A1* | 12/2005 | Ismailov | | F02D 41/20 239/585.1 |
| 2007/0256797 A1* | 11/2007 | Orton | | E05F 15/681 160/188 |
| 2009/0283354 A1* | 11/2009 | Matsuda | | B62D 5/008 180/446 |
| 2010/0005918 A1* | 1/2010 | Mizuno | | B25J 9/102 74/490.03 |
| 2010/0179736 A1* | 7/2010 | Johnson | | F16H 48/30 701/51 |
| 2011/0155277 A1* | 6/2011 | Coles | | B65B 13/285 140/93.6 |
| 2013/0163184 A1* | 6/2013 | Fujiwara | | G06F 1/181 361/679.38 |
| 2013/0250506 A1* | 9/2013 | Fujiwara | | G06F 1/16 361/679.31 |
| 2014/0083379 A1* | 3/2014 | Yoshimura | | F01L 1/3442 123/90.15 |
| 2014/0265170 A1* | 9/2014 | Giovanardi | | F15B 13/0444 280/5.5 |
| 2014/0318007 A1* | 10/2014 | Hogan | | F16M 11/18 47/39 |
| 2015/0129344 A1* | 5/2015 | Nehls | | B60R 25/02156 180/287 |
| 2015/0135895 A1* | 5/2015 | Tay | | F16H 63/065 74/817 |
| 2015/0224845 A1* | 8/2015 | Anderson | | B60G 17/019 701/37 |
| 2016/0131205 A1* | 5/2016 | Essenmacher | | F16D 41/125 192/41 A |
| 2017/0145704 A1* | 5/2017 | Coles | | B65B 13/285 |
| 2017/0167597 A1* | 6/2017 | Ishige | | B62D 5/001 |
| 2017/0282964 A1* | 10/2017 | Sekikawa | | B62D 5/001 |

* cited by examiner

LOCK FOR VEHICLE ACTIVE FRONT STEERING SYSTEM

BACKGROUND

A vehicle may include an adaptive front steering system (AFS) system that may add and subtract an angle between the driver steering wheel input and the steering gear input shaft. The adaptive front steering system may include an electronic control unit (ECU), a motor, a gear and a locking device. The locking device may provide a mechanical connection between the steering wheel and wheels during power-off of the AFS system (i.e., before and/or after shutting down the engine) and it may lock the actuator in case of a failure in the AFS system.

The locking unit of the AFS system may include a solenoid including a pin and a spring for biasing the pin in a direction toward an extended position in engagement with a locking disc connected to a shaft of the motor of the AFS system.

When the pin moves into and/or out of engagement with the locking disc, the pin may generate an objectionable noise, e.g., a clicking noise. For example, to engage the solenoid with the locking plate, a duty cycle to the solenoid is reduced and the pin begins to move toward the extended position under the bias of the spring. When the pin makes contact with the locking plate, an objectionable clicking noise may be produced. A similar clicking noise may be produced when the solenoid is disengaged from the locking disc when the pin impacts internal components of the solenoid. Despite this long known problem with such systems, there remains a very significant need for an effective solution to eliminate the noise of such systems and yet be operable in the operating environment of the AFS system.

DRAWINGS

DETAILED DESCRIPTION

Figure 1:
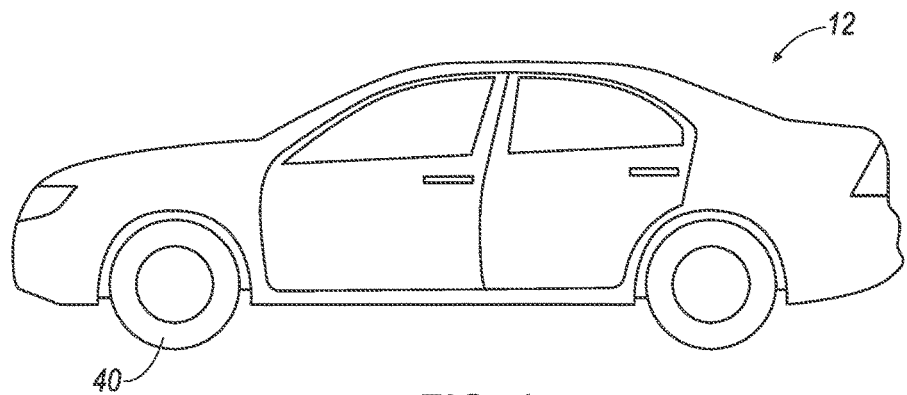
FIG. 1 is a side view of a vehicle.

With reference to the Figures, wherein like numerals indicate like parts throughout the several views, a system 10 for a vehicle 12 includes a gear 14 and a plate 16 fixed to the gear 14. The system 10 may, for example, be an adaptive front steering (AFS) system of the vehicle 12. A solenoid 18 includes a coil 20 and a pin 22 moveable relative to the coil 20 to engage the plate 16 based on a signal 24 (identified in FIGS. 6 and 7). A sensor 26 is configured to detect a change in current 28 (identified in FIGS. 6 and 7) through the coil 20 associated with initial movement of the pin 22 relative to the coil 20. A controller 30 is programmed to change the signal 24 in response to the change in current 28.

Figure 3A:
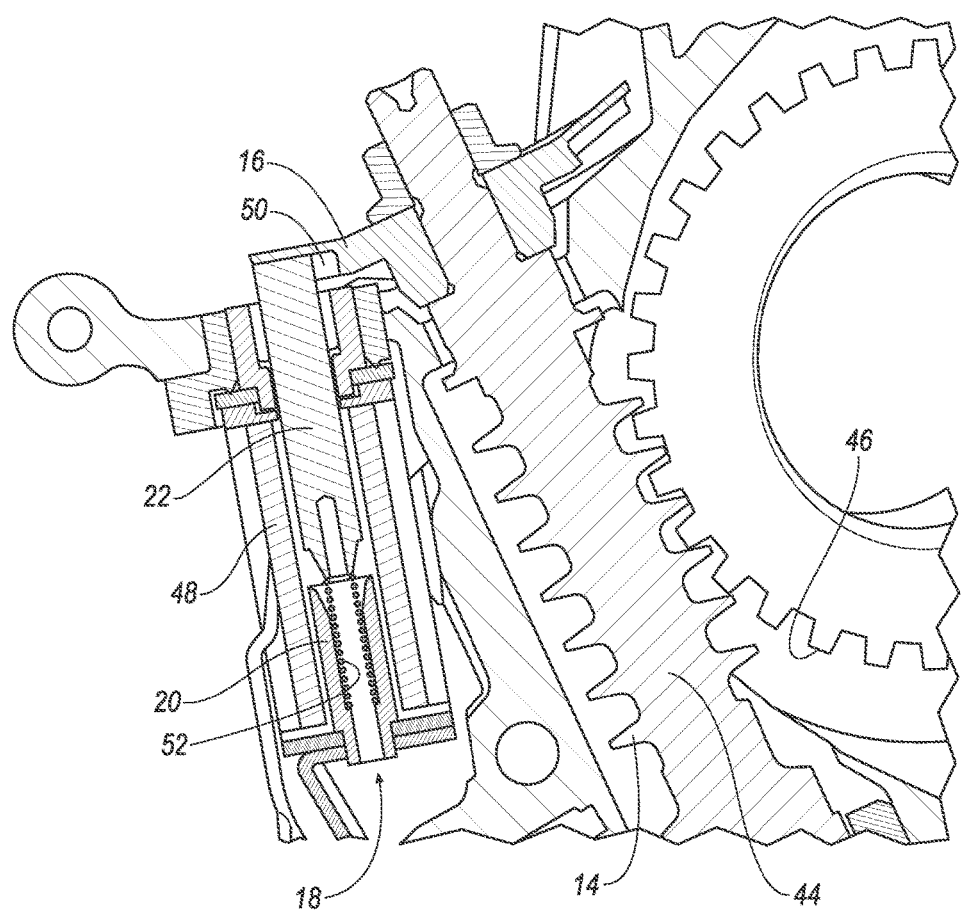
FIG. 3A is a cross-sectional view of a portion of the AFS system including a gear, a shaft of a motor engaged with the gear, and a solenoid including a pin engaging a locking plate on the shaft.

Specifically, the pin 22 of the solenoid 18 is extendable relative to the coil 20 to an extended position, as shown in FIG. 3A, to engage the plate 16, and is retractable relative to the coil 20 to a retracted position to disengage the plate 16. In the engaged position, the pin 22 prevents movement of the plate 16 and the gear 14, and thus prevents input from the system 10 to a steering system 32 of the vehicle 12, as set forth further below. In the disengaged position, the pin 22 is disengage with the pin 22, thus allowing the system 10 to provide input to the steering system 32 of the vehicle 12. The controller 30 may adjust the signal 24 to move the pin 22 to the engaged position when the vehicle 12 is shut down, e.g., the ignition is turned off, and may adjust the signal 24 to move the pin 22 to the disengaged position when the vehicle 12 is turned on, e.g., an ignition of the vehicle 12 is turned on.

Figure 2:
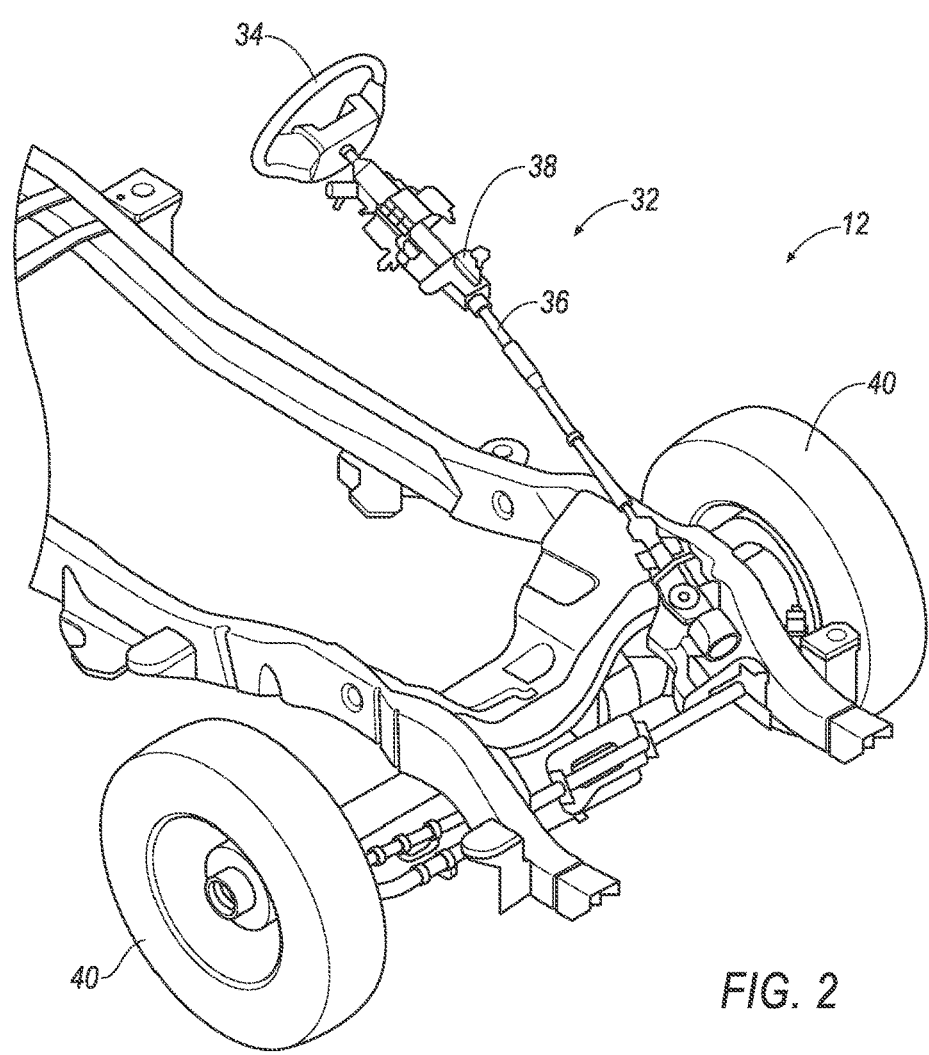
FIG. 2 is a perspective view of a portion of the vehicle including an adaptive front steering (AFS) system.

With reference to FIG. 2, the steering system 32 may include a steering wheel 34 and a steering shaft 36 connected to the steering wheel 34 for adjusting the direction of front wheels 40 of the vehicle 12. The steering system 32 may include a housing 38 supporting the steering wheel 34 and the steering shaft 36. The system 10 may adjust the steering of the vehicle 12 by adding and subtracting rotational angle between rotation of the steering wheel 34 by the driver and the steering shaft 36 to provide various affects to steering performance of the vehicle 12. In other words, the system 10 may adjust rotation of the steering shaft 36 relative to the steering wheel 34 to adjust steering of the vehicle 12.

Figure 3B:
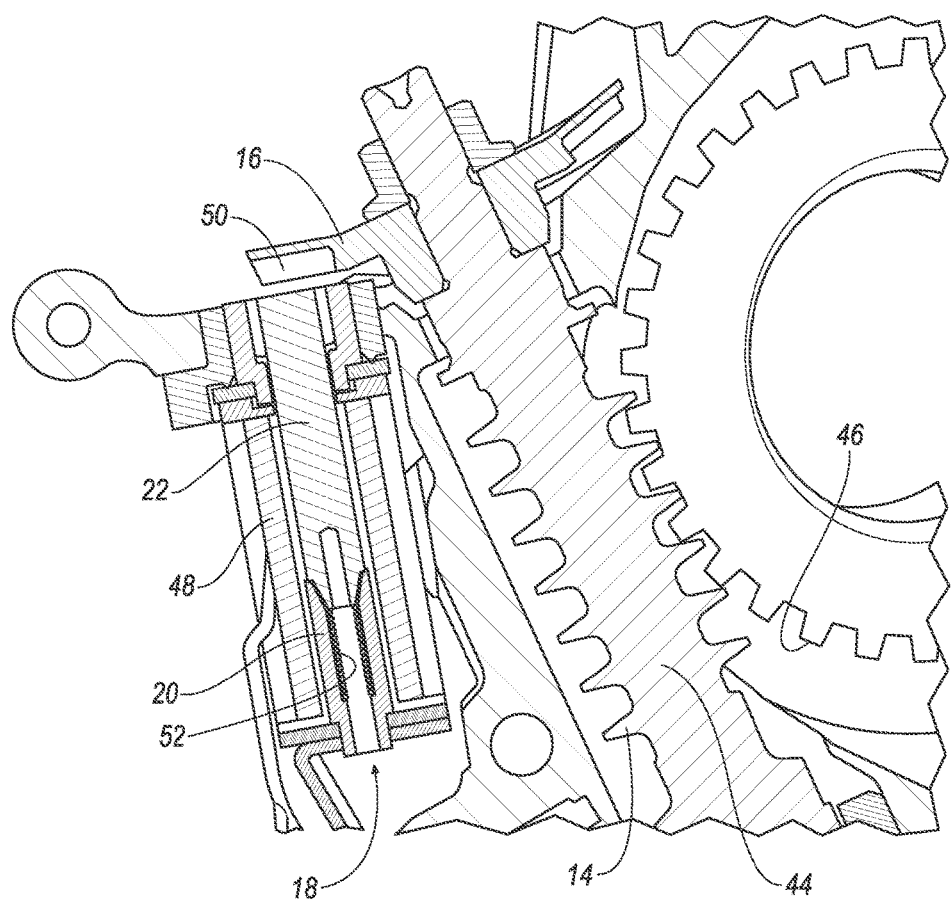
FIG. 3B is the cross-sectional view of FIG. 3 with the pin disengaged from the locking plate.
Figure 4:
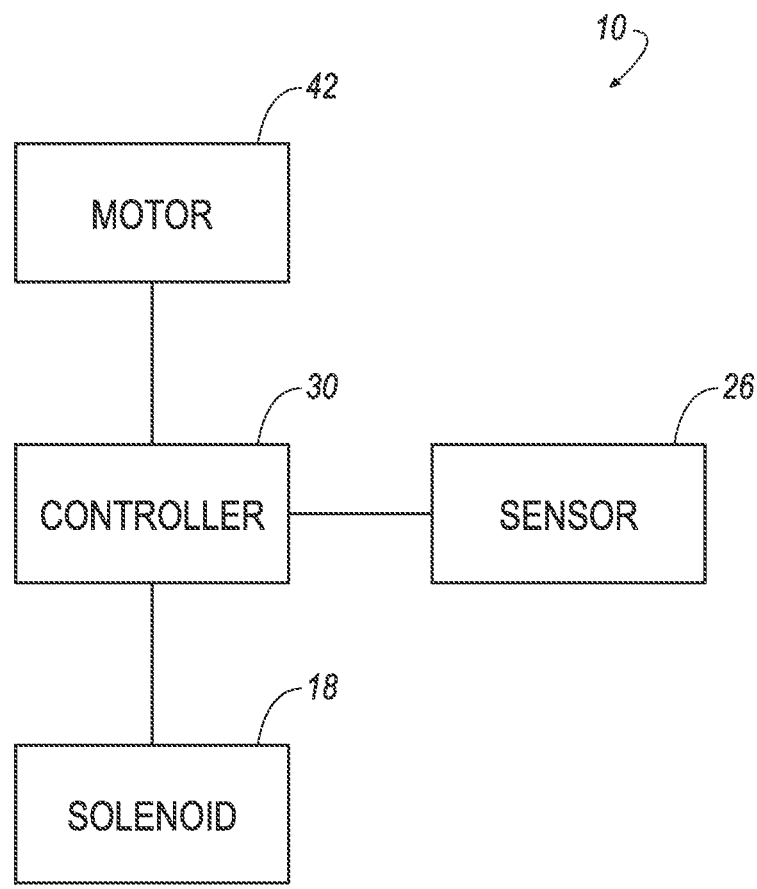
FIG. 4 is a schematic of the AFS system.
Figure 5:
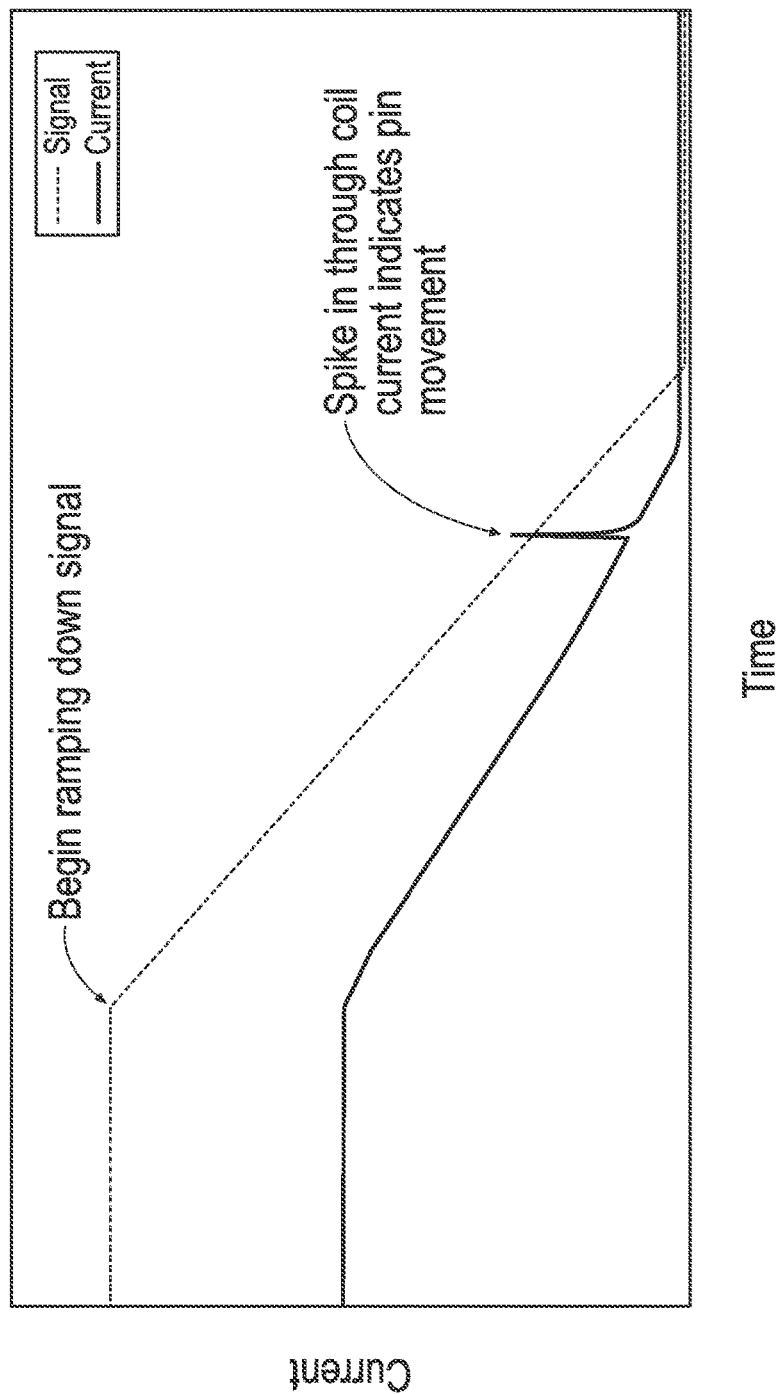
FIG. 5 is a graph of a known duty cycle signal applied to a coil of the solenoid versus time and the associated current through the coil of the solenoid during shutdown of the AFS system.

With reference to FIGS. 3-4, the system 10 may include a motor 42 coupled to the gear 14 to rotate the gear 14 for providing the input from the system 10 to the steering shaft 36. The steering system 32 may include a gear 46 coupled to the steering wheel 34 and the steering shaft 36 and engaged with the gear 14 of the system 10. The gear 46 of the steering shaft 36 may be, for example, a component of a planetary gear system (not numbered), coupling the steering wheel 34 and the steering shaft 36 to allow relative rotation between the steering wheel 34 and the steering shaft 36.

The motor 42 may include a shaft 44 rotatably supporting the gear 14. The gear 14, for example, may be a worm gear. The gear 14 of the system 10 engages the gear 46 of the steering system 32 such that rotation of the motor 42 may be transmitted into rotation of the gear 46 to adjust the steering of the vehicle 12. Specifically, the gear 46 may be rotated by the gear 14 to increase rotation of the steering shaft 36 in addition to the rotation provided by the steering wheel 34 or to decrease rotation of the steering shaft 36 to subtract from the rotation provided by the steering wheel 34. In other words, the rotation of the gear 14 increases or decreases the rotation transmitted from the steering wheel 34 to the steering shaft 36.

The solenoid 18 may be attached to the housing 38 of the steering system 32. Specifically, the solenoid 18 may include a case 48 that houses the coil 20, and the case 48 may be fixed to the housing 38.

The pin 22 is extendable from and retractable relative to the coil 20. The pin 22 may be axially slideable relative to the coil 20, i.e., the solenoid 18 may be a plunger-type solenoid. As other examples, the solenoid 18 may be a pivoted armature solenoid, a rocker solenoid, etc. The solenoid 18 may include a spring 52 that biases the pin 22 toward the extended position.

As set forth above, the plate 16 is fixed to the gear 14. In other words, the plate 16 rotates with the gear 14. As shown in FIGS. 3A-3B, the plate 16 may define one or more pockets 50 and the pin 22 is extendable into and retractable from the pocket 50.

The controller 30, for example, may be an electronic control unit (ECU) that may be dedicated to controlling the system 10. As another example, the controller 30 may be an engine control module or other control module of the vehicle 12. In this example, the engine control module may include the ECU or may alternatively provide the function of the ECU, i.e., such that the ECU is unitary with the engine control module.

As shown in FIG. 4, the controller 30 is in communication with the sensor 26, the solenoid 18, and/or the motor 42. As set forth further below, the controller 30 may receive data, e.g., measurements of the current 28 through the coil 26, from the sensor 26. The controller 30 may transmit signals to the solenoid 18 and/or the motor 42.

As set forth above, the position of the pin 22 may be controlled by the signal 24. The signal 24 may be, for example, a pulse width modulation (PWM) signal, supplied by the controller 30 to the coil 20 of the solenoid 18. The PWM signal may be controlled according to a duty cycle.

The pin 22 of the solenoid 18 is moveable relative to the coil 20 based on the signal 24 applied to the coil 20. A change in the signal 24 changes the current 28 through the coil 20, which changes the magnetic field produced in the coil 20. Specifically, the signal 24 may be increased to increase current 28 through the coil 20 to move the pin 22 from the engaged position to the disengaged position. Specifically, the increase in current 28 through the coil 20 increases the magnetic force produced by the coil 20 to pull the pin 22 against the force of the spring 52 to move the pin 22 to the disengaged position. The current 28 may be maintained to maintain the pin 22 in the disengaged position.

Similarly, the signal 24 may be decreased to decrease the current 28 through the coil 20 to move the pin 22 from the disengaged position to the engaged position. Specifically, the decrease in current 28 through the coil 20 decreases the magnetic force produced by the coil 20 to allow the spring 52 to move the pin 22 to the engaged position.

As set forth above, the controller 30 is programmed to change the signal 24 in response to the change in current 28 through the coil 20 sensed by the sensor 26. As such, the controller 30 is programmed to slow movement of the pin 22 between the engaged and disengaged positions. This slowed movement reduces or eliminates clicking noises associated with the pin 22 seating in the engaged position and the disengaged position.

The sensor 26 of the system 10 senses current 28 through the coil 20 of the solenoid 18, i.e., the sensor 26 may be a current 28 sensor 26. The sensor 26 periodically or continuously measures the current 28 through the coil 20 of the solenoid 18 and transmits a signal 24 to the controller 30.

The sensor 26 is configured to detect initial retraction of the pin 22 relative to the coil 20 based on the current 28 through the coil 20. After this initial retraction, and the controller 30 programmed to reduce the signal 24 in response to the change in current 28 associated with the initial retraction.

Figure 6:
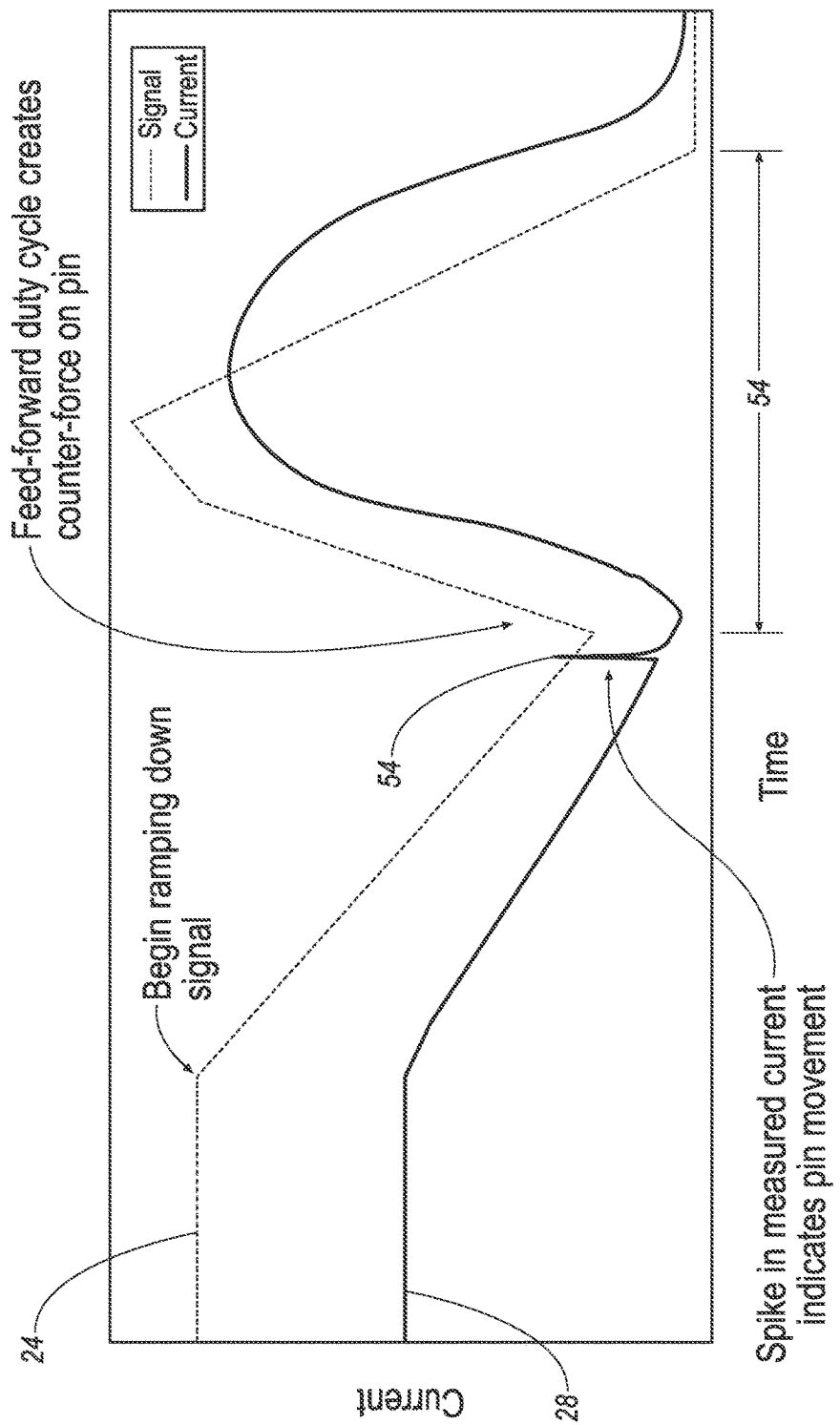
FIG. 6 is a graph of the AFS system of the present disclosure showing the duty cycle signal applied to the coil versus time, and measured current in the coil versus time during shutdown to the AFS system.

Specifically, as shown in FIG. 6, the controller 30 may decrease the signal 24 to the coil 20, e.g., the duty cycle is decreased, to decrease the current 28 through the coil 20 and move the pin 22 from the retracted position to the extended position. The current 28 through the coil 20 spikes (identified at spike 54 in FIG. 6) when the pin 22 initially moves from the retracted position to the extended position, i.e., at first movement of the pin 22 relative to the coil 20. The spike 54 is temporary as a result of this initial movement, as shown in FIG. 6. In the locking movement shown in FIG. 6, the controller 30 is programmed to increase the signal 24 to the coil 20 to increase the current 28 through the coil 20 in response to the spike 54 in current 28, to slow the movement of the pin 22 toward the extended position. As shown in FIG. 6, this decrease in current 28 is temporary. This slowed movement of the pin 22 decreases or eliminates a clicking noise made by the pin 22 when the pin 22 reaches the extended position.

The controller 30 may programmed to change the signal 24 at a predetermined time 56 after the change in signal 24 responsive to the change in current 28. Specifically, the predetermined time 56 may be based on, i.e., triggered by, the change in signal 24 following the spike 54, and/or may be based on, i.e., triggered by, the spike 54 itself. The predetermined time 56 may be any suitable length of time.

As an example, the controller 30 may provide the signal 24, e.g., the PWM signal, on a duty cycle signal between 0 and 1. For example, to move the pin 22 to the retracted position, the controller 30 adjusts the duty cycle applied to the coil 20 for approximately between 300 and 500 milliseconds to retract the pin 22 from the recess of the locking plate 16. Once the pin 22 is in the retracted position, to maintain the pin 22 retracted, the controller 30 adjusts the signal 24 to have a duty cycle of approximately 0.4 (+/−0.1) as shown in FIG. 6, e.g., while the vehicle 12 is operational (i.e., the engine of the vehicle 12 is not shut down). The controller 30 may operate a current 28 control loop, i.e., the current 28 applied to the coil 20 is controlled by adjusting the signal 24 accordingly, as the PWM signal needed to maintain the pin 22 in the retracted position or extended position may change based on specifications of the solenoid 18, variations in temperature, etc.

With continued reference to FIG. 6, upon shutdown of the vehicle 12, the controller 30 begins ramping 22 down the signal 24 applied to the coil 20 toward zero to reduce the magnetic force biasing the pin 22 in the retracted position against the spring force of the spring 52. When the magnetic force of the coil 20 is sufficiently reduced to substantially match the biasing force of the spring 52, the pin 22 will move under the biasing force of the spring 52 to the extended position to engage the pocket 50 of the locking plate 16.

The controller 30 may ramp down the signal 24 at a rate of approximately 50%. As the signal 24 to the coil 20 is ramped down, the current 28 sensor 26 continues to monitor the current 28 in the coil 20 and provides the detected current 28 information to the controller 30 to identify the point in time when the pin 22 begins to move from the retracted position and toward the extended position. The movement of the pin 22 may be seen as a short spike 54 in the measured current 28 detected by the current 28 sensor 26. The spike 54 in current 28 is created by the movement of the pin 22 through the magnetic field of the coil 20 under the biasing force of the spring 52.

Figure 7:
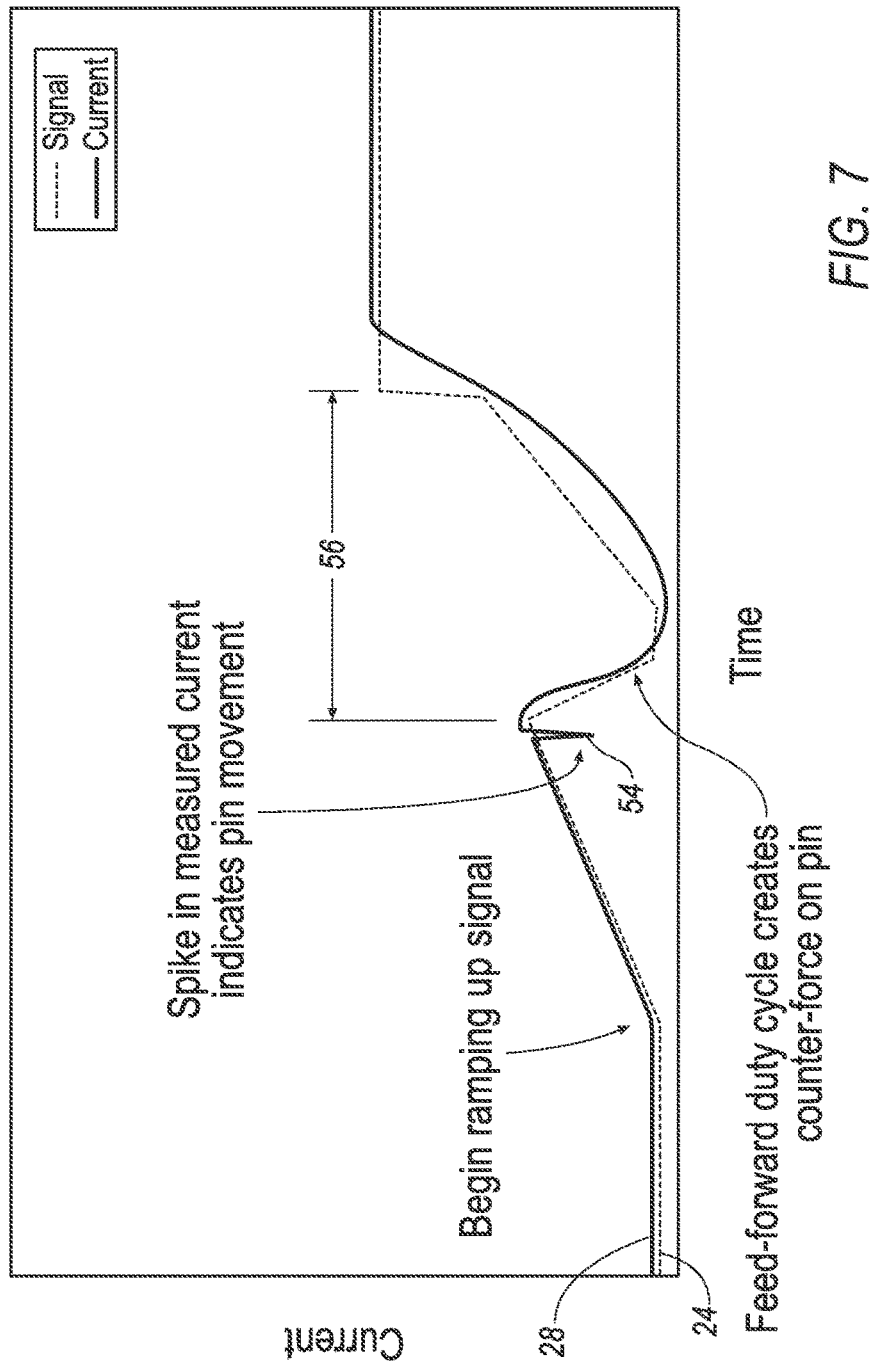
FIG. 7 is a graph of the AFS system of the present disclosure showing the duty cycle signal applied to the coil versus time, and measured current in the coil versus time during startup of the AFS system.

Upon the sensing of the movement of the pin 22 as represented by the spike 54 in the detected current 28 from the current 28 sensor 26, the controller 30 is programmed to immediately increase the PWM duty cycle back toward 1, for example, to increase the current 28 through the coil 20, at a rate of between approximately 66% and 80% for a period of approximately 100 milliseconds. This temporarily generates a magnetic counter force in the coil 20 to cause the pin 22 to decelerate thereby reducing or eliminating a clicking noise associated with the pin 22 being seated in the extended position, e.g., contact of the pin 22 with the locking plate 16, case 48, etc. The controller 30 may be programmed with a lookup table for defining the various settings for the PWM signal 24 for operating the locking solenoid 18 to obtain this quiet function. The lookup table settings may be adjusted using feedback from the current 28 sensor 26 until the pin 22 is decelerated to a desired speed to obtain the quiet function As shown in FIG. 7, the controller 30 may increase the signal 24 to the coil 20, e.g., the duty cycle is increased, to increase the current 28 through the coil 20 and move the pin 22 from the extended position to the retracted position. The current 28 through the coil 20 spikes (identified at spike 54 in FIG. 7) when the pin 22 initially moves from the extended position to the retracted position, i.e., at first movement of the pin 22 relative to the coil 20. The spike 54 is temporary as a result of this initial movement, as shown in FIG. 7. In the unlocking movement shown in FIG. 7, the controller 30 is programmed to decrease the signal 24 to the coil 20 to decrease the current 28 through the coil 20 in response to the spike in current 28, to slow the movement of the pin 22 toward the retracted position. As shown in FIG. 7, this increase in current 28 is temporary. This slowed movement of the pin 22 decreases or eliminates a clicking noise made by the pin 22 when the pin 22 reaches the retracted position.

The controller 30 may programmed to change the signal 24 at a predetermined time 58 after the change in signal 24 responsive to the change in current 28. Specifically, the predetermined time 58 may be based on, i.e., triggered by, the change in signal 24 following the spike 54, and/or may be based on, i.e., triggered by, the spike 54 itself. The predetermined time 58 may be any suitable length of time.

As an example, the controller 30 may provide the signal 24, e.g., the PWM signal, on a duty cycle signal between 0 and 1. For example, to move the pin 22 to the retracted position, the controller 30 may adjust the duty cycle applied to the coil 20 for approximately between 300 and 500 milliseconds to retract the pin 22 from the recess of the locking plate 16. Once the pin 22 is in the retracted position, to maintain the pin 22 retracted, the controller 30 may adjust the signal 24 to have a duty cycle of approximately 0.1 (+/−0.1) as shown in FIG. 7, e.g., while the vehicle 12 is operational and input from the system 10 is desired.

With continued reference to FIG. 7, upon start-up of the vehicle 12, the controller 30 begins ramping 22 up the signal 24 applied to the coil 20 toward 1 to increase the magnetic force biasing the pin 22 toward the retracted position against the spring force of the spring 52. When the magnetic force of the coil 20 is sufficiently increased to above the biasing force of the spring 52, the pin 22 will move against the biasing force of the spring 52 to the retracted position to disengage the pocket 50 of the locking plate 16.

The controller 30 may ramp up the signal 24 at a rate of approximately 50%. As the signal 24 to the coil 20 is ramped up, the sensor 26 continues to monitor the current 28 in the coil 20 and provides the detected current 28 information to the controller 30 to identify the point in time when the pin 22 begins to move from the extracted position and toward the retracted position. The movement of the pin 22 may be seen as a short spike 54 in the measured current 28 detected by the current 28 sensor 26. The spike 54 in current 28 is created by the movement of the pin 22 through the magnetic field of the coil 20 against the biasing force of the spring 52.

Upon the sensing of the movement of the pin 22 as represented by the spike 54 in the detected current 28 from the current 28 sensor 26, the controller 30 is programmed to immediately increase the PWM duty cycle back toward 0, for example, to decrease the current 28 through the coil 20, at a rate of between approximately 66% and 80% for a period of approximately 100 milliseconds. This temporarily reduces the magnetic force in the coil 20 countering the spring 52 to cause the pin 22 to decelerate, thereby reducing or eliminating a clicking noise associated with the pin 22 being seated in the retracted position, e.g., contact of the pin 22 with the case 48, coil 20, etc. The controller 30 may be programmed with a lookup table for defining the various settings for the PWM signal 24 for operating the locking solenoid 18 to obtain this quiet function. The lookup table settings may be adjusted using feedback from the current 28 sensor 26 until the pin 22 is decelerated to a desired speed to obtain the quiet function.

The solenoid 18 may include a sound-deadening or insulating material, such as a rubberized coating, may be incorporated on any or all of the recess of the locking disc to further reduce the noise of the solenoid 18.

The controller 30 may include a data storage medium that stores computer-executable instructions associated with transmitting the signal 24 to the coil 26 and receiving measurements of the current 28 from the sensor 26. The controller 30 may be a component of a computing system (not numbered) of the vehicle 12. In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The present disclosure is described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising:
a gear;
a plate fixed to the gear;
a solenoid including a coil and a pin moveable relative to the coil to engage the plate;
a controller programmed to supply a signal to the coil to control movement of the pin relative to the coil;
a sensor configured to detect a spike in current through the coil associated with initial movement of the pin relative to the coil; and
wherein the controller is programmed to reduce the voltage to the coil to extend the pin relative to the coil and is programmed to increase the voltage to the coil in response to the spike in current.

2. The system as set forth in claim 1 wherein the controller is programmed to reduce the level of the signal at a predetermined time after the increase of the level of the signal.

3. The system as set forth in claim 1 wherein the plate defines a pocket and the pin is extendable into and retractable from the pocket.

4. The system as set forth in claim 1 further comprising a steering shaft engaged with the gear and a motor connected to the gear.

5. A system comprising:
a gear;
a plate fixed to the gear;
a solenoid including a coil and a pin extendable relative to the coil to engage the plate;
a controller programmed to supply a signal to the coil to control movement of the pin relative to the coil;
a sensor configured to detect initial retraction of the pin relative to the coil based on a spike in the current through the coil; and
wherein the controller is programmed to increase the voltage to the coil to retract the pin relative to the coil and is programmed to reduce the voltage to the coil for a predetermined period of time in response to the spike in the current.

6. The system as set forth in claim 5 wherein the controller is programmed to increase the voltage to the coil after the predetermined time.

7. The system as set forth in claim 5 wherein the plate defines a pocket and the pin is extendable into and retractable from the pocket.

8. The system as set forth in claim 5 further comprising a steering shaft engaged with the gear and a motor connected to the gear.

9. A system comprising:
a gear;
a plate fixed to the gear;
a solenoid including a coil and a pin extendable relative to the coil to engage the plate;
a controller programmed to supply a signal to the coil to control movement of the pin relative to the coil;
a sensor configured to detect initial retraction of the pin relative to the coil based on a spike in the current through the coil; and
wherein the controller is programmed to reduce the voltage to the coil to retract the pin relative to the coil and is programmed to increase the voltage to the coil for a predetermined period of time in response to the spike in current.

10. The system as set forth in claim 9 wherein the controller is programmed to increase the voltage to the coil after the predetermined time.

11. The system as set forth in claim 9 wherein the plate defines a pocket and the pin is extendable into and retractable from the pocket.

12. The system as set forth in claim 9 further comprising a steering shaft engaged with the gear and a motor connected to the gear.

13. A system comprising:
a gear;
a plate fixed to the gear;
a solenoid including a coil and a pin moveable relative to the coil to engage the plate;
a controller programmed to supply a signal to the coil to control movement of the pin relative to the coil;
a sensor configured to detect a spike in current through the coil associated with initial movement of the pin relative to the coil; and wherein the controller is programmed to increase the voltage to the coil to extend the pin relative to the coil and is programmed to reduce the voltage to the coil for a predetermined period of time in response to the spike in current.

14. The system as set forth in claim 13 wherein the controller is programmed to increase the voltage to the coil after the predetermined time.

15. The system as set forth in claim 13 wherein the plate defines a pocket and the pin is extendable into and retractable from the pocket.

16. The system as set forth in claim 13 further comprising a steering shaft engaged with the gear and a motor connected to the gear.

* * * * *